United States Patent Office 3,023,247
Patented Feb. 27, 1962

3,023,247
ALKYLAROMATIC ALDEHYDES AND THEIR PREPARATION
Igor Scriabine, Lyon, France, assignor to Société des Usines Chimiques Rhone-Poulenc, Paris, France, a French body
No Drawing. Filed July 28, 1958, Ser. No. 751,111
Claims priority, application France Aug. 1, 1957
2 Claims. (Cl. 260—599)

The present invention relates to a new process for the preparation of alkylaromatic aldehydes and to the production of this process, some of which are believed to be new compounds.

It is known to prepare aryl ketones by condensing unsaturated aliphatic ketones with aromatic hydrocarbons in the presence of aluminium chloride.

On the other hand, the preparation of alkylaromatic aldehydes by an analogous condensation of unsaturated aldehydes with aromatic hydrocarbons has not previously been described, and since when saturated aldehydes are reacted with aromatic hydrocarbons in the presence of catalysts of the Friedel and Crafts type, such as aluminum chloride, the reaction proceeds in another direction, two molecules of aromatic hydrocarbon condensing with one molecule of aldehyde to give a diaryl alkane, it was not to be expected that unsaturated aldehydes could be caused to give alkyl aromatic aldehydes.

It has now been found that it is possible to prepare alkylaromatic aldehydes by condensing aromatic compounds either with α-ethylenic aldehydes or with diacylates of alken-2-ylidenes, which are the diesters of the hydrated form of these aldehydes, by operating in the presence of titanium tetrachloride, which may with advantage be activated by boron trifluoride or a complex of boron trifluoride.

According to the invention therefore alkylaromatic aldehydes of the general formula Ar.CHB.CHA.CHO, in which Ar is an aromatic group and A and B are the same or different and are hydrogen atoms or alkyl groups (especially lower alkyl groups containing 1–4 carbon atoms) are made by a process which comprises reacting an aromatic compound with an aldehydic reactant which is either an ethylenically unsaturated aldehyde of the general formula CH$_2$:CA.CHO or an alken-2-ylidene diacylate of the general formula CHB:CA.CH(OOCR)$_2$, R being a lower alkyl or aryl group, in the presence of titanium tetrachloride as catalyst, and, when an alken-2-ylidene diacylate is used, hydrolysing the product.

Examples of aldehydes of formula CH$_2$:CA.CHO are acrolein, α-methylacrolein and α-ethylacrolein, this reaction being represented by the following equation ArH+CH$_2$=CA.CHO→Ar.CH$_2$.CHA.CHO When, instead of aldehydes, the diesters of the hydrated form of aldehydes are employed, the process is applicable to a larger number of compounds and more especially to compounds of the general formula:

CHB:CA.CH(OOCR)$_2$ wherein R represents a lower alkyl group or an aryl group such as phenyl or mono-substituted phenyl, e.g. tolyl. In this case the immediate product of the condensation is the monoester of the enolic form of an alkyl aromatic aldehyde, which can thereafter be hydrolysed to the aldehyde, this whole process being represented by the equations:

ArH+CHB:CA.CH(OOCR)$_2$
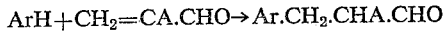→Ar.CHB.CA:CH.OOCR+RCOOH

Ar.CHB.CA:CH.OOCR+H$_2$O
→Ar.CHB.CHA.CHO+RCOOH

Although a large number of diesters derived from the hydrated forms of α-ethylenic aldehydes can be used, there may be more especially mentioned those which are derived from acrolein, α-methylacrolein, α-ethylacrolein, α-propylacrolein, crotonal, β-ethylacrolein and α-methyl-β-ethylacrolein. The acetic diesters are preferably employed, but the dipropionates, dibutyrates and dibenzoates may also be used.

Of the aromatic compounds which can be used in accordance with the invention, hydrocarbons such as benzene, toluene, the xylenes, cumene, cymene and tert-butylbenzene, and halogenated hydrocarbons such as chlorobenzene are particularly suitable. Phenol ethers, such as anisol, may also be employed.

When the aromatic compound employed comprises a substituent, the condensation takes place either in the para-position or in the para- and ortho-positions, depending upon the nature of the substituent.

It is advantageous to employ an excess of aromatic compound over the aldehyde or over the diester derived from the aldehyde, for example from two to five molecules and even more to one molecule of aldehyde or of diester. The quantity of titanium tetrachloride used is preferably about one molecule per molecule of aldehyde or of diester.

The speed of the condensation reaction is substantially increased if there is added to the reaction mixture boron trifluoride, which performs the function of a promoter. It may be employed in the form of complex mixtures or compounds with oxygenated organic compounds, e.g. alcohols, aliphatic ethers, cyclic ethers such as tetrahydrofuran, or organic acids.

The quantity of promoter may vary from 0.005 to 0.1 mol., and preferably from 0.02 to 0.05 mol., per mol. of aldehyde.

The condensation must be effected at a low temperature, in particular between −30° and +20° C. and preferably between −15° and −5° C. In practice the reaction is best carried out by slowly pouring the α-ethylenic aldehyde or the diester into the aromatic hydrocarbon, which is maintained at the desired low temperature and contains the catalyst. The duration of the reaction varies in accordance with the nature and the proportions of the reactants and with the temperature, but is generally 15 minutes to 3 hours. When the condensation is complete, the reaction mixture is poured onto ice to hydrolyse the titanium tetrachloride, after which the organic layer is decanted.

When the reactants are an aromatic hydrocarbon and a free α-ethylenic aldehyde, the organic layer thus obtained is composed of alkylaromatic aldehyde and an excess of hydrocarbon. The alkylaromatic aldehyde is extracted either by distillation after washing and drying or by steam distillation, or again by converting the aldehyde into its bisulphite compound, which is then isolated and from which the aldehyde is regenerated by known means. Instead of bisulphite, other known reactants serving to isolate aldehydes may be employed.

If, instead of an α-ethylenic aldehyde itself, the diester of the hydrated form of such an aldehyde has been employed, the decanted organic layer consists of the monoester of the enolic form of an alkylaromatic aldehyde, with an excess of the hydrocarbon employed. This excess of hydrocarbon may then be separated by distillation in vacuo, whereafter the residue is subjected, if desired after purification, to hydrolysis in either an acid or an alkaline medium. Some of the monoesters of the above-defined type are fairly readily aldolisable in alkaline media, and in such cases, it is preferable to effect the hydrolysis in an acid medium.

The following non-limitative examples illustrate the invention. The parts are by weight.

Example I 52 parts of dry cumene are introduced into a spherical flask provided with an agitator, a dropping funnel and a tube leading to the atmosphere through an inlet pipe leading from a column packed with calcium chloride. After cooling to −10° C. by means of a cooling bath, 19 parts of titanium tetrachloride and 0.55 part of boron fluoride etherate are added with agitation. A mixture of 7 parts of α-methacrolein and 13 parts of cumene is gradually introduced through the dropping funnel (in 45 minutes) with agitation, the temperature being maintained at −10° C. When the introduction has been completed, the mixture is further agitated for 10 minutes at −10° C., whereafter the reaction mixture is poured with agitation onto a mixture of 100 parts of ice and 10 parts of concentrated hydrochloric acid. The brownish-red solution becomes decolourised. The resulting slightly yellow organic layer is decanted, washed with water and then with sodium bicarbonate in 5% aqueous solution, dried over anhydrous magnesium sulphate and distilled under reduced pressure. After distillation of the excess of cumene, 7.2 parts of a fraction distilling at 90–128° C. under 1 mm. Hg and containing 5.59 parts of 2-methyl-3-(4′-isopropylphenyl)propionic aldehyde are obtained. On rectification in vacuo the pure aldehyde is isolated. It boils at 92° C. under 1 mm. Hg and gives a semi-carbazone melting at 170° C. There remain 9.1 parts of distillation residue. This residue, heated for several hours at 230° C. under a vacuum of 20 mm. Hg with 0.1 part of active acid earth, gives 3.9 parts of distillate boiling at 82–140° C. under 20 mm. Hg and containing a further 1.09 part of 2-methyl-3-(4′-isopropylphenyl)propionic aldehyde, which brings the total yield to 6.68 parts.

Example II

The procedure of Example I is followed, the 0.55 part of boron fluoride etherate being replaced by 0.8 part of the boron trifluoride/acetic acid complex $$BF_3 \cdot 2CH_3COOH$$

After distillation, 5.51 parts of 2-methyl-3-(4′-isopropylphenyl)propionic aldehyde are obtained.

Example III

By proceeding as in Example I, with a mixture of 138 parts of dry toluene, 19 parts of titanium tetrachloride and 0.6 part of boron fluoride etherate, into which a solution of 6 parts of acrolein in 9.2 parts of toluene are run in 18 minutes at −27° C., and hydrolysing after 7 minutes of agitation at 25° C., there are obtained after distillation 6.1 parts of 3-(methylphenyl)propionic aldehyde boiling at 92–93° C. under 1.5 mm. Hg, $n_D^{30}=1.5171$, which is a mixture of para- and ortho-isomers.

Example IV

By proceeding as in Example III with 360 parts of cumene, 38 parts of titanium tetrachloride, 1.3 parts of boron trifluoride etherate, to which is added at −30° C. a mixture of 12 parts of acrolein and 24 parts of cumene, there are obtained 13.4 parts of 3-(4′-isopropylphenyl)-propionic aldehyde boiling at 89–92° C. under 0.5 mm. Hg; $n_D^{25}=1.511$.

Example V

Into a 1-litre spherical flask cooled by a salt-ice bath are introduced 520 parts of cumene, 211 parts of technical titanium tetrachloride and 3 parts of boron fluoride etherate. The mixture is cooled to −10° C., and while this temperature is maintained with continuous agitation, 158 parts of allylidene diacetate in solution in 130 parts of cumene are run in over 100 minutes. When all the diacetate has been run in the mixture is agitated for a further 40 minutes at −10° C., whereafter the dark brownish-red reaction mixture is poured onto a mixture of 500 parts of crushed ice with 50 parts of concentrated hydrochloric acid to separate the catalyst. The resulting decolourised organic layer is decanted, washed with water and then with a 5% sodium tartrate solution, and dried over magnesium sulphate, and the excess of hydrocarbon is distilled off under reduced pressure. There are obtained 182.7 parts of 3-(4′-isopropylphenyl)-propen-1-yl monoacetate (yield: 83.9% on the allylidene diacetate), $B.P._{0.5}=101–103°$ C., $n_D^{24}=1.5115$. This monoacetate, when hydrolysed by boiling under reflux with its own weight of 6 N sulphuric acid and four times its weight of ethyl alcohol, gives free 3-(4′-isopropylphenyl)propionic aldehyde, $B.P._{0.9}=90–91°$ C.; semicarbazone M.P. 148° C.

Example VI

The procedure of Example V is followed, employing 517 parts of cumene, 211 parts of titanium tetrachloride and 3 parts of boron fluoride etherate, a mixture of 172 parts of α-methyl allylidene diacetate $(B.P._{755}=178.5°C., D_{15}^{15}=1.056, n_D^{22}=1.4275)$ with 130 parts of cumene being run in.

After hydrolysis of the titanium tetrachloride on ice, the reaction product is decanted, washed, dried and then distilled under a progressive vacuum, the distillation being stopped when the weight of the residue is 206 parts. This residue contains 85% of 3-(4′-isopropylphenyl)-2-methyl-propen-1-yl monoacetate ($B.P._{0.8}=101°$ C.; $d_4^{35}=0.9813$; $n_D^{25}=1.5007$). The residue is dissolved in 150 parts of methyl alcohol, a solution of 76 parts of potassium carbonate in 143 parts of water is added, and the mixture is boiled under reflux, with vigorous agitation, until saponification is complete. The methanol is then distilled off. The residue separates into two layers. The organic layer gives on distillation 138.3 parts of 2-methyl-3-(4′-isopropylphenyl)propionic aldehyde, $B.P._{0.6}=89°$ C.; semicarbazone M.P.=170° C., yield 72.7%.

Example VII

The procedure of Example V is followed, the allylidene diacetate being replaced by 172 parts of crotylidene diacetate. There are obtained 84 parts of 3-methyl-3-(4′-isopropylphenyl)-propen-1-yl monoacetate distilling at 107–110° C. under 0.5 mm. Hg, which product, when hydrolysed by an aqueous alcoholic solution of sulphuric acid gives 3-methyl-3-(4′-isopropylphenyl)-propionic aldehyde, the characteristics of which are $B.P._{0.5}=89–91°$ C.; semi-carbazone M.P.=131–132° C.; 2:4-dinitro-phenyl-hydrazone M.P.=118–120° C.

Example VIII

The procedure of Example V is followed, with 104 parts of cumene, 56.5 parts of titanium tetrachloride, 0.5 part of boron trifluoride etherate and a solution of 40 parts of 2-methyl-penten-2-ylidene diacetate ($B.P._{1.3}=86–87°$ C.; $n_D^{25}=1.437$) in 26 parts of cumene. There are obtained 24.4 parts of the monoacetate of the enolic form of an aldehyde, having the following characteristics: $B.P._{0.8}=114–115°$ C.; $n_D^{20}=1.5100$; on hydrolysis by means of a solution of sulphuric acid in methanol this yields 16 parts of free aldehyde having the following characteristics: $B.P_{0.9}=104–105°$ C.; 2:4-dinitrophenyl hydrazone M.P.=169–169.5° C.

Example IX

The procedure of Example V is followed, with 80 parts of toluene, 26 parts of titanium tetrachloride, 0.5 part of boron trifluoride etherate and 17.2 parts of crotylidene diacetate. There are obtained 11.4 parts (56%) of 3-methyl-3-(4′-methylphenyl)-propen-1-yl monoacetate, $B.P._{0.75}=104–105°$ C. On hydrolysis by means of sulphuric acid in an aqueous alcoholic medium there is obtained 3-methyl-3-(4′-methylphenyl)propionic aldehyde, the characteristics of which are: $B.P._{0.9}=110.5°–111.5°$ C.; $n_D^{25}=1.5112$, p-nitrophenyl hydrazone M.P. 110–110.5° C.; 2:4-dinitrophenyl hydrazone M.P. 106–109° C.; semicarbazone M.P. 78–81° C.

*Example X*

A solution of 63.2 parts of allylidene diacetate in 48 parts of benzene is introduced with agitation in 1 hour into a mixture, cooled to +6° C., of 192 parts of anhydrous benzene, 82 parts of titanium tetrachloride and 125 parts of boron fluoride etherate, the temperature being maintained between 6° and 7° C. Agitation is continued for 40 minutes at this temperature, whereafter the product is run into a mixture of ice and concentrated hydrochloric acid. The organic layer is decanted, washed with water and with sodium bicarbonate, dried and distilled. There are obtained 24.9 parts of 3-phenyl-propen-1-yl acetate, B.P.$_{.1mm.}$=85° C.; $n_D^{22}=1.5165$. This acetate, when hydrolysed with sulphuric acid in aqueous alcoholic solution, gives 3-phenylpropionic aldehyde, B.P.$_{.12mm.}$=101° C.; $n_D^{21.5}=1.5190$. The semicarbazone melts at 127° C.

*Example XI*

The procedure of Example X is followed, but the allylidene diacetate is replaced by 68.8 parts of α-methylallylidene diacetate. There are obtained 23.6 parts of 3-phenyl-2-methyl-propen-1-yl acetate, B.P.$_{.0.9mm.}$=90–92° C.; $n_D^{24}=1.5140$, which gives after hydrolysis 3-phenyl-2-methylpropionic aldehyde, B.P.$_{.6mm.}$=92° C.; $n_D^{24}=1.5087$. The semicarbazone melts at 123° C., and the 2:4-dinitrophenylhydrazone at 119° C.

*Example XII*

The procedure of Example X is followed, but the allylidene diacetate is replaced by 74.5 parts of α-ethylallylidene diacetate. There are obtained 29.2 parts of 3-phenyl-2-ethylpropen-1-yl acetate, B.P.$_{.0.9mm.}$=90–92° C.; $n_D^{24}=1.5105$, which gives on hydrolysis 3-phenyl-2-ethyl-propionic aldehyde, B.P.$_{.10mm.}$=104.5; $n_D^{26}=1.5063$. The di-2:4-dinitrophenyl hydrazone melts at 116.5° C.

*Example XIII*

The procedure of Example X is followed, but the allylidene diacetate is replaced by 80 parts of α-isopropyl allylidene diacetate. There are obtained 17.5 parts of 3-phenyl-2-isopropyl-propen-1-yl acetate, B.P.$_{.0.5mm.}$=96.7° C.; $n_D^{24}=1.5060$, which gives on hydrolysis 3-phenyl-2-isopropylpropionic aldehyde, B.P.$_{.10.5mm.}$=120.5° C.; $n_D^{28}=1.5020$. The 2:4-dinitrophenyl hydrazone melts at 143–144° C.

*Example XIV*

Into a mixture of 208 parts of toluene, 85 parts of titanium tetrachloride and 1.2 parts of boron fluoride etherate, there is introduced with agitation in 70 minutes at −10° C. a solution of 74.5 parts of α-ethylallylidene diacetate in 52 parts of toluene. Agitation is continued for 90 minutes at −10° C., and hydrolysis is effected as in the preceding examples. There are obtained 67 parts of 3-(4′-methylphenyl)-2-ethylpropen-1-yl acetate (yield 77%), B.P.$_{.2}$=125–6° C., $n_D^{31}=1.5090$. When saponified by potassium carbonate in an aqueous methanolic medium, this substance gets a yield of 91% of 3-(4′-methylphenyl)-2-ethylpropionic aldehyde, B.P.$_{.0.5mm.}$=86–86.5° C., $n_D^{31}=1.5070$, semicarbazone M.P.=125–126° C., 2:4-dinitrophenyl hydrazone M.P.=118–119° C.

This aldehyde has an odour resembling that of cyclamal, and has a very characteristic fragrance.

*Example XV*

The procedure of the preceding example is followed, the toluene being replaced by 236 and 59 parts of ethylbenzene respectively. There are obtained 65.5 parts of 3-(4′-ethylphenyl)-2-ethyl-propen-1-yl acetate (yield 71%), B.P.$_{.1.3mm.}$=113–114° C., $n_D^{32}=1.5075$, which when saponified by potassium carbonate in an aqueous methanolic medium gives 92% of 3-(4′-ethylphenyl)-2-ethylpropionic aldehyde, B.P.$_{.1mm.}$=98–99° C.; $n_D^{26}=1.5072$; semicarbazone M.P.=82–83° C.

*Example XVI*

The procedure of the preceding example is followed, there being employed as the aromatic hydrocarbon 260 and 65 parts of cumene respectively. There are obtained 57.8 parts of 3-(4′-isopropylphenyl)-2-ethyl-propen-1-yl acetate (yield 59%); B.P.$_{.1mm.}$=120° C.; $n_D^{25}=1.5060$, which gives, after saponification with potassium carbonate in an aqueous methanolic medium, a yield of 89% of 3-(4′-isopropylphenyl)-2-ethylpropionic aldehyde, B.P.$_{.0.5mm.}$=94° C., $n_D^{28.5}=1.5010$, 2:4-dinitrophenyl hydrazone M.P.=98–99° C.

This aldehyde has a characteristic fruity odour.

*Example XVII*

The procedure of the preceding examples is followed, a phenolic ether being employed instead of an aromatic hydrocarbon. 116 parts of anisol, 43 parts of titanium tetrachloride, 0.62 part of boron fluoride etherate and 31 parts of allylidene diacetate are employed. There are obtained 35 parts of 3-(4′-methoxyphenyl)-propen-1-yl acetate (yield: 86.5%) B.P.$_{.1mm.}$=113–116° C., $n_D^{25}=1.5245$ which gives, after saponification with sulphuric acid in aqueous alcoholic solution, 23.8 parts (yield 86%) of 3-(4′-methoxyphenyl)propionic aldehyde, B.P.$_{.1mm.}$=82–84° C., $n_D^{25}=1.5257$, semicarbazone M.P.=138° C.

I claim:
1. A process for the manufacture of alkylaromatic aldehydes of the general formula Ar.CHB.CHA.CHO. in which Ar represents a group selected from the class consisting of a mononuclear aromatic hydrocarbon, a chlorinated mononuclear aromatic hydrocarbon and a lower alkoxy mononuclear aromatic hydrocarbon, A is selected from the class consisting of hydrogen and lower alkyl and B is selected from the class consisting of hydrogen and lower alkyl, which comprises reacting an aromatic compound selected from the class consisting of mononuclear aromatic hydrocarbons, chlorinated mononuclear aromatic hydrocarbons and lower alkoxy mononuclear aromatic hydrocarbons with an aldehyde compound selected from the class consisting of ethylenically, unsaturated aldehydes of the general formula

$$CH_2:CA.CHO$$

and alken-2-ylidene diacylates of the general formula CHB:CA.CH(OOCR)$_2$ where R is selected from the class consisting of lower alkyl and aryl, in the presence of titanium tearachloride as catalyst and in the presence of a promoter selected from the class consisting of boron trifluoride and complex compounds of boron trifluoride with oxygenated organic compounds said promoter being present in a proportion of 0.005 to 0.1 mols per mol of titanium tetrachloride, said reaction being effected at a temperature between −30° C. and +20° C. and where a diacylate is employed, subjecting the product to hydrolysis.

2. A process according to claim 1, wherein the reaction is effected at a temperature between −15° and −5° C. and the amount of promoter is 0.02–0.05 molecular proportion for each molecular proportion of the aldehyde.

References Cited in the file of this patent

Thomas: Anhydrous Aluminum Chloride, in Organic Chemistry (1941), pages 477–479.

West, et al.: Synthetic Perfumes (1949), pages 144–145.

Moncrieff: The Chemistry of Perfumery Materials (1949), pages 37, 38.